(12) United States Patent
Udagawa et al.

(10) Patent No.: US 7,014,194 B2
(45) Date of Patent: Mar. 21, 2006

(54) CYLINDER HEAD GASKET

(75) Inventors: Tsunekazu Udagawa, Ichikawa (JP); Yuuichi Kinoshita, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/049,881

(22) Filed: Feb. 4, 2005

(65) Prior Publication Data
US 2005/0167930 A1     Aug. 4, 2005

(30) Foreign Application Priority Data
Jan. 4, 2004     (JP) ............................. 2004-028301

(51) Int. Cl.
*F02F 11/00*     (2006.01)
(52) U.S. Cl. ...................... 277/594; 277/595
(58) Field of Classification Search ................ 277/593, 277/594, 595, 600
See application file for complete search history.

(56) References Cited

U.S. PATENT DOCUMENTS

| 4,728,110 A | * | 3/1988 | Nakasone | 277/595 |
| 4,739,999 A | * | 4/1988 | Ishii et al. | 277/595 |
| 4,834,399 A | | 5/1989 | Udagawa et al. | |
| 4,976,445 A | * | 12/1990 | Udagawa | 277/595 |
| 4,995,624 A | * | 2/1991 | Udagawa et al. | 277/595 |
| 5,209,504 A | * | 5/1993 | Udagawa et al. | 277/595 |
| 5,451,063 A | * | 9/1995 | Udagawa et al. | 277/595 |
| 6,315,303 B1 | * | 11/2001 | Erb et al. | 277/593 |

FOREIGN PATENT DOCUMENTS

| EP | 1 035 359 | 9/2000 |
| EP | 1 111 277 | 6/2001 |
| FR | 2 319 059 | 2/1977 |
| JP | H03-19452 | 2/1991 |

* cited by examiner

*Primary Examiner*—Alison K. Pickard
(74) *Attorney, Agent, or Firm*—Manabu Kanesaka

(57) ABSTRACT

A cylinder head gasket for an internal combustion engine is basically formed by first and second metal plates laminated together. The first metal plate includes a base portion, a first hole to be sealed formed in the base portion, a curved portion extending from the base portion to surround the first hole, a flange extending from the curved portion and located above the base portion, an annular portion formed in the flange immediately outside the curved portion, and a first bead formed in the flange outside the annular portion to project outwardly. The second metal plate is laminated on the base portion not to overlap with the flange.

9 Claims, 4 Drawing Sheets

CYLINDER HEAD GASKET

BACKGROUND OF THE INVENTION AND RELATED ART STATEMENT

The present invention relates to a cylinder head gasket installed between two members, such as a cylinder head and a cylinder block, of an internal combustion engine for sealing.

In case contacting surfaces of the cylinder head and the cylinder block (cylinder body) of an engine of an automobile are sealed, a cylinder head gasket made of metal is installed therebetween to seal combustion gas, cooling water and lubricating oil.

A cylinder head gasket has been changed from a lamination type formed of a plurality of metal plates laminated together to a simple type formed of one or two metal plates with a demand of lightening weight of an engine and reducing a manufacturing cost. Also, a material to be used as the gasket is limited and a kind and a number of sealing means are limited because of one or two metal plates as the constituting plates and lightening of the engine. It is thus required to use a relatively simple sealing means.

Also, as a result of lightening of the engine and making the engine small, rigidity of the engine is lowered. In sealing the cylinder head gasket, if a large sealing surface pressure is applied around a peripheral portion close to a cylinder bore in order to obtain a sealing ability, deformation of a cylinder bore with low rigidity is further promoted. Thus, the sealing means of the gasket can not function sufficiently, and it is difficult to obtain an appropriate sealing ability.

On the other hand, for example, as shown in FIG. 9, a metal laminate gasket 5 has been proposed such that in a metal cylinder head gasket 5 for an internal combustion engine formed of metal plates 60, 70 constituting at least two metal main bodies, one metal plate 60 is bent around a hole 6 to be sealed to form a sealing portion with a flange 61, at least one bead 61b is formed at the flange 61, and another metal plate 70 is laminated not to overlap an end portion 61c of the flange 61 (refer to Patent Document 1).

In this structure, a portion to be sealed can be sealed properly with thin plates and with a relatively lower tightening pressure, and when a force is applied to the gasket, the gasket can slide relatively easily with respect to a cylinder head contacting the gasket. Also, it is possible to provide a relatively large sealing area around a hole to be sealed.

However, in the structure disclosed in the metal laminate gasket, since the bead formed at the flange-projects inwardly, a large sealing surface pressure is not generated. Also, since a portion outside the bead extends in an annular shape, a surface pressure distribution concentrically formed is prevented. In the gasket 5 as shown in FIG. 9, the surface pressure distribution appears as shown in FIG. 10. Accordingly, it may not properly respond to sealing requirement of a cylinder bore of an engine with small size and low rigidity.

Patent Document: Japanese Utility Model Publication (Kokai) No. 3-19452.

The present invention has been made in view of the above problems, and an object of the invention is to provide a cylinder head gasket which can provide sufficient sealing ability while preventing deformation of a cylinder bore of an engine.

Further objects and advantages of the invention will be apparent from the following description of the invention.

SUMMARY OF THE INVENTION

In order to attain the above objects, a cylinder head gasket of the invention is formed of at least two metal plates. One metal plate is bent around a hole for a cylinder bore to form a sealing portion with a flange, and an annular portion is formed in the flange around the hole for the cylinder bore. A bead is formed in a periphery of the flange outside the annular portion to project outwardly.

In this structure, a large sealing surface pressure is not generated at a portion immediately close to the hole for the cylinder bore, and a large sealing surface pressure is formed at a portion slightly away from the hole for the cylinder bore, i.e. a portion which does not largely affect the deformation of the hole for the cylinder bore.

In the above cylinder head gasket, since an outside skirt portion of the bead is formed as an outer periphery portion of the flange, a flat portion is not formed outside the bead. Accordingly, a concentrated surface pressure is generated at the bead.

In the cylinder head gasket of the invention, the sealing portion with the flange is formed by bending around the hole for the cylinder bore, and in the flange, the annular portion is formed around the hole for the cylinder bore. Therefore, a portion close to the hole for the cylinder bore becomes the annular portion so that a large sealing surface pressure is not generated.

Also, since the bead projecting outwardly is formed at the outer peripheral portion outside the annular portion, a large sealing surface pressure is formed at the portion slightly away from the hole for the cylinder bore, i.e. the portion which does not largely affect the deformation of the hole for the cylinder bore.

Also, since the outer skirt portion of the bead becomes the outer peripheral end of the flange, an annular portion is not formed outside the bead. Thus, a concentrated surface pressure is formed at the bead to thereby generate the appropriate surface pressure.

Accordingly, a large surface pressure for the cylinder bore is not generated around the portion immediately outside the hole for the cylinder bore, and is formed at the periphery slightly away from the hole for the cylinder bore. Therefore, the deformation of the cylinder bore is prevented while providing a sufficient sealing ability.

DETAILED DESCRIPTION OF PREFERRED EMBODIMENTS

Next, embodiments of a cylinder head gasket of the invention will be explained with reference to the drawings.

Figure 1:
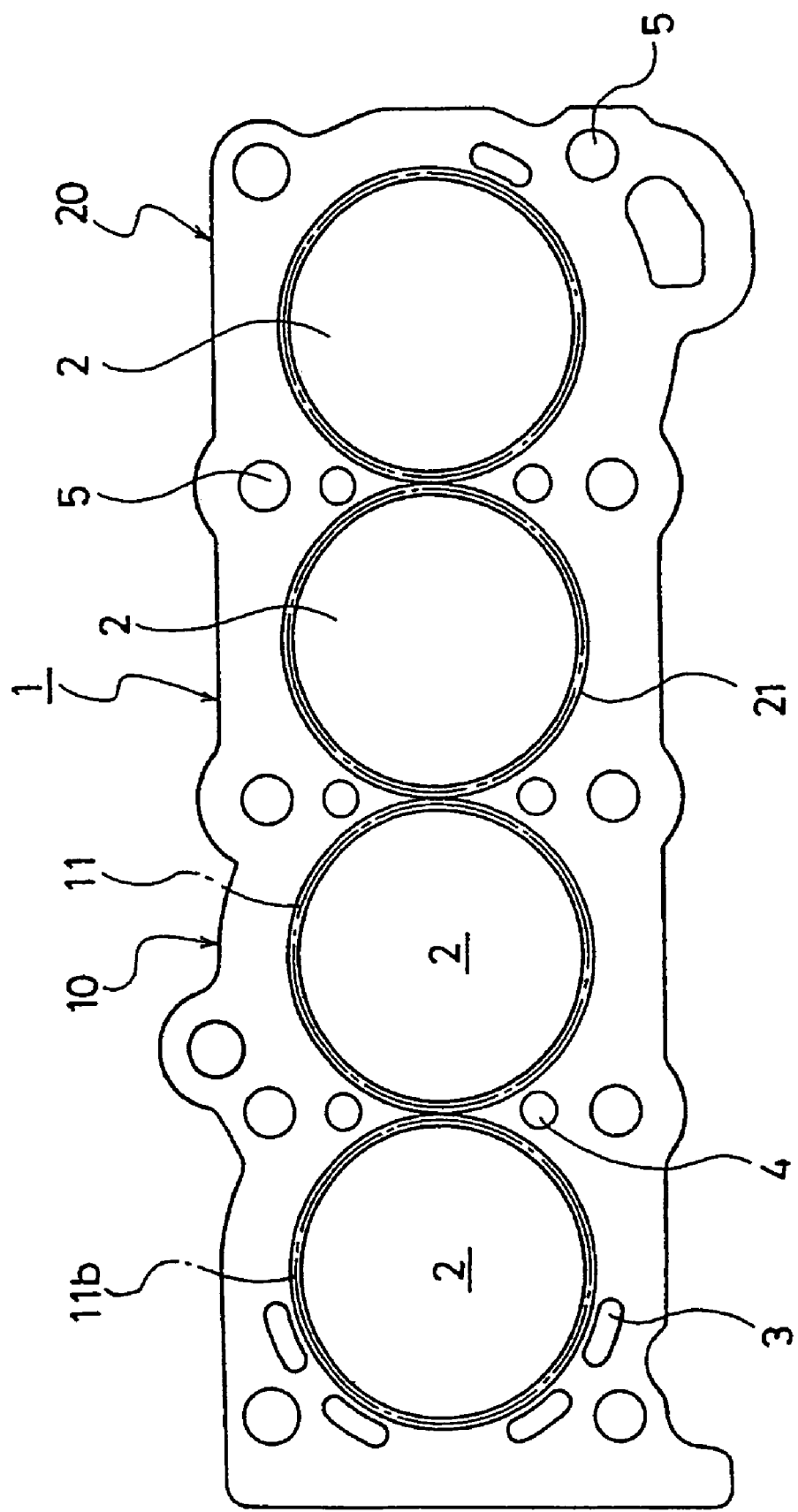
FIG. 1 is a plan view showing a cylinder head gasket of a first embodiment of the invention.

As shown in FIG. 1, a cylinder head gasket 1 of the embodiment of the invention is a metal lamination type gasket sandwiched between a cylinder head and a cylinder block (cylinder body), and seals gases with high temperature and pressure in the cylinder bores, and liquids such as cooling water and oil in the cooling water paths and cooling oil paths.

Figure 2:
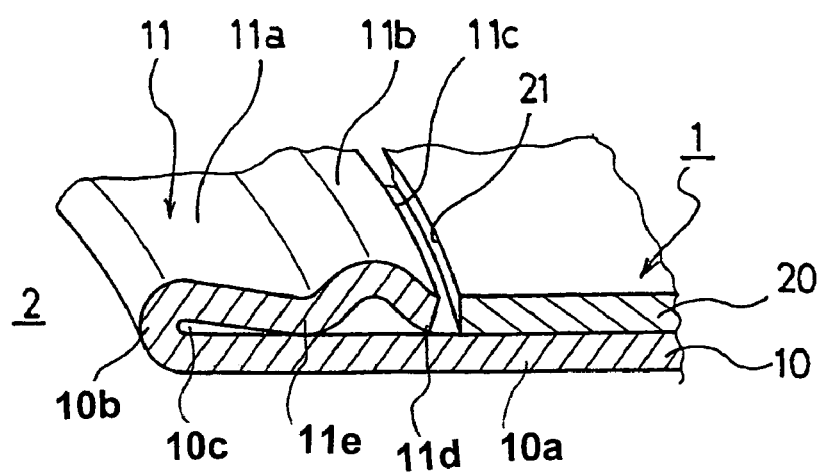
FIG. 2 is a partial perspective view with a section showing a structure of the first embodiment of the invention.

Incidentally, FIG. 2 is an explanatory drawing, wherein the size and the vertical-lateral ratio of the thickness, bead, surface pressure reinforcing plate and so on of the metal laminate gasket 1 are shown differently from the actual ones to understand easily by emphasizing the sealing portion.

As shown in FIG. 1 and FIG. 2, the cylinder head gasket 1 of the first embodiment of the invention is constructed by two metal plates 10, 20, such as stainless anneal member, stainless quality adjustment member (spring steel plate) and soft steel plate. These metal plates 10, 20 are made according to the shape of the engine member, such as cylinder block, and are formed with holes 2 for the cylinder bores, water holes 3 for the cooling water, oil holes 4 for circulating engine oil, bolt holes 5 for tightening bolts, as shown in FIG. 1.

A sealing portion having a flange 11 is formed around the hole 2 for the cylinder bore to be sealed by bending one metal plate 10 in the metal plates 10, 20, and an annular portion 11a is formed in this flange around the hole 2 for the cylinder bore. A bead 11b projecting outwardly is provided in a peripheral edge of the flange outside the annular portion, so that an outside skirt portion of the bead 11b is made as an outer peripheral edge 11c of the flange 11.

The bead 11b is formed to surround each hole 2 for the cylinder bore. The annular portion 11a of the flange 11 is located at the inner side of the bead 11b, but there is no annular portion outside the bead 11b. An end of the outside skirt portion 11d of the bead 11b becomes the outer peripheral edge 11c, as it is.

In particular, the metal plate 10 includes a base portion 10a, and a curved portion 10b surrounding the hole 2 for the cylinder bore. A space 10c is formed at a side opposite to the hole 2. Also, outside and inside skirt portions 11d, 11e of the bead 11b contact the base portion 10a.

Also, the second metal plate 20 is arranged outside the outer peripheral edge 11c of the flange 11. Namely, the second metal plate 20 is provided for the hole 2 of the cylinder bore with a hole 21 having an inner peripheral edge greater than the outer peripheral edge 11c of the flange 11.

Figure 3:
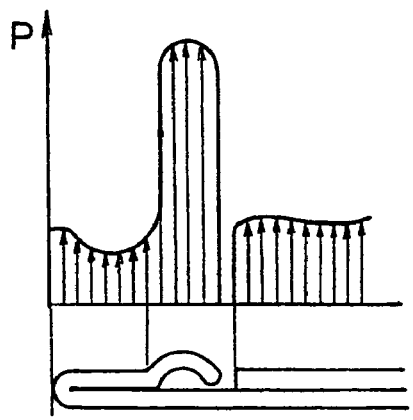
FIG. 3 is a chart showing an example of a surface pressure distribution in the cylinder head gasket shown in FIG. 2.

In this structure, the pressure distribution as shown in FIG. 3 is obtained.

Figure 4:
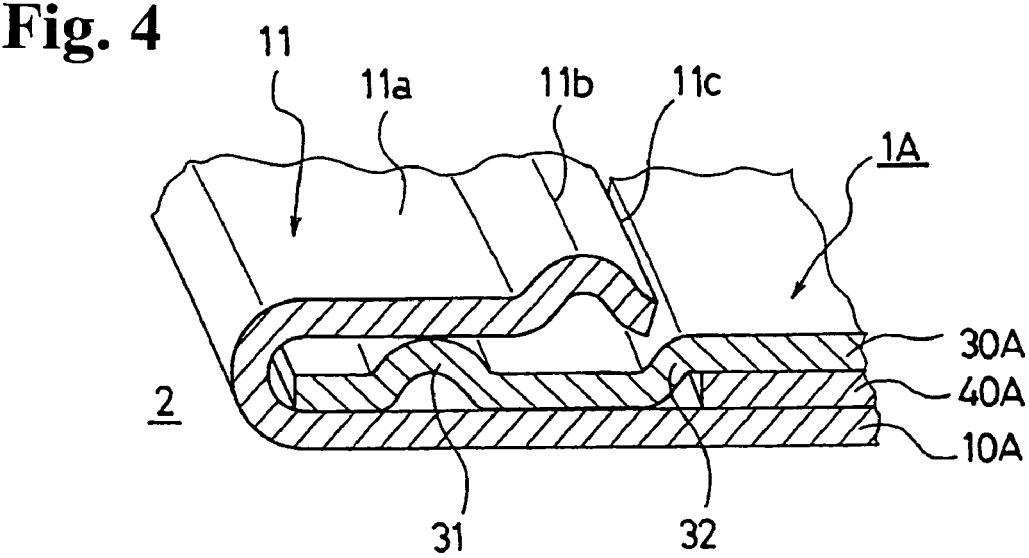
FIG. 4 is a partial perspective view with a section showing a structure of a cylinder head gasket of a second embodiment of the invention.

A cylinder head gasket 1A of a second embodiment of the invention shown in FIG. 4 is constructed by three metal plates 10A, 30A, 40A. The metal plate 10A is formed as in the first embodiment. In the cylinder head gasket 1A of the second embodiment, the metal plate 30A is inserted inside the annular portion 11a of the flange 11 of the metal plate 10A. The metal plate 30A is provided with a second bead 31 inside the annular portion 11a to surround the hole 2 for the cylinder bore. Further, a half bead 32 is formed to surround the outside of the bead 11b of the metal plate 10A. Further, the metal plate 40A having a hole 41 greater than the diameter of the half bead 32 is arranged between the metal plates 30A, 10A.

Figure 5:
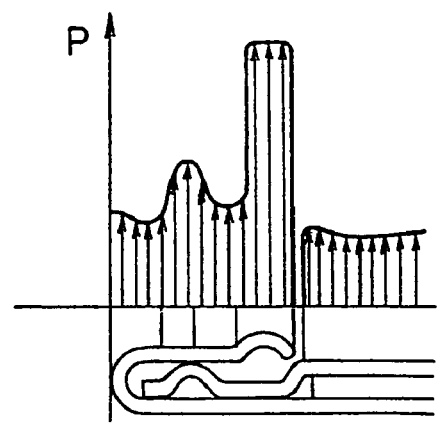
FIG. 5 is a chart showing an example of a surface pressure distribution in the cylinder head gasket shown in FIG. 4.

In this structure, a seal line is formed near the hole 2 for the cylinder bore, so that multiple seal lines are formed. A pressure distribution as shown in FIG. 5 is obtained.

Figure 6:
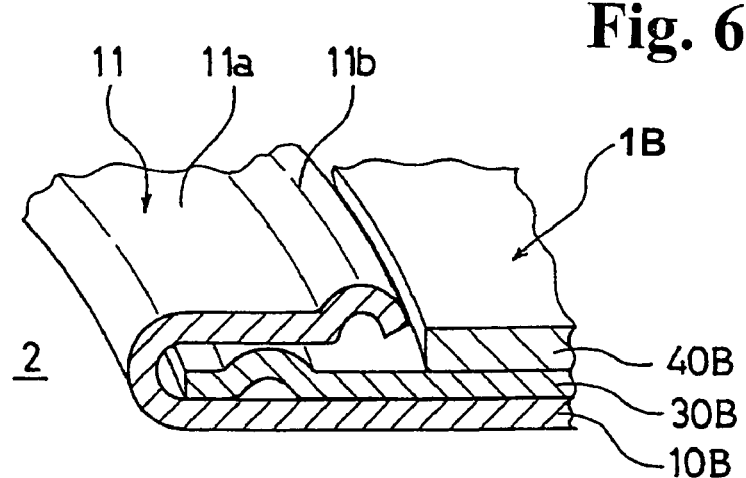
FIG. 6 is a partial perspective view with a section showing a structure of a cylinder head gasket of a third embodiment of the invention.
Figure 7:
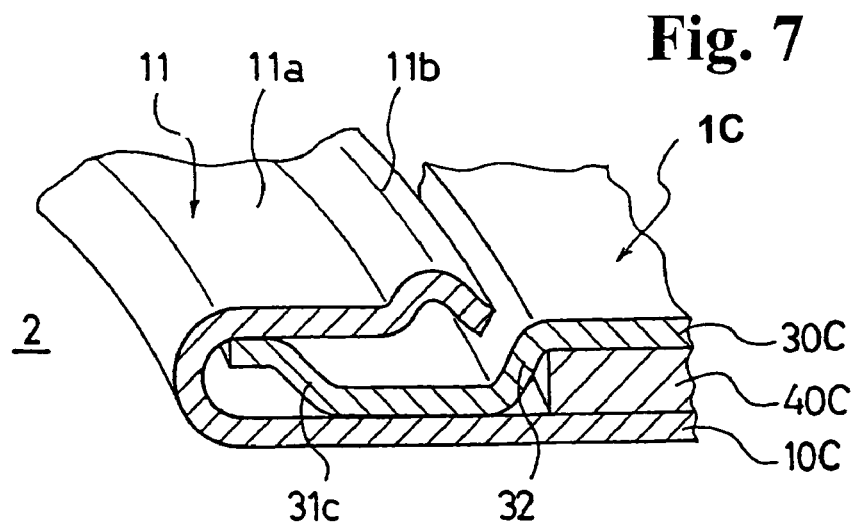
FIG. 7 is a partial perspective view with a section showing a structure of a cylinder head gasket of a fourth embodiment of the invention.
Figure 8:
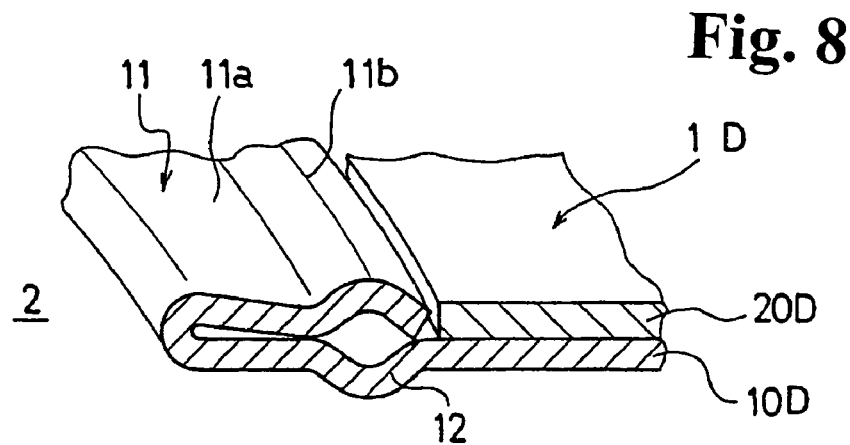
FIG. 8 is a partial perspective view with a section showing a structure of a cylinder head gasket of a fifth embodiment of the invention.
Figure 9:
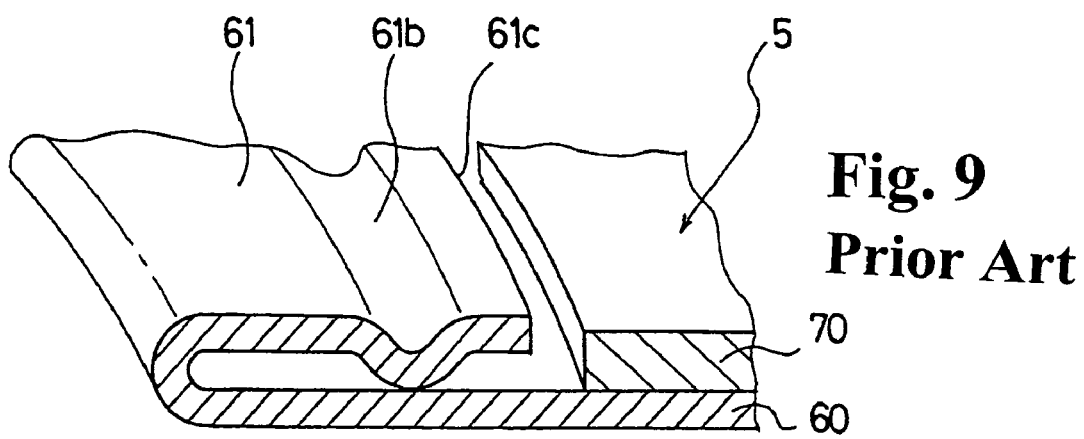
FIG. 9 is a partial perspective view with a section showing a structure of a conventional cylinder head gasket.
Figure 10:
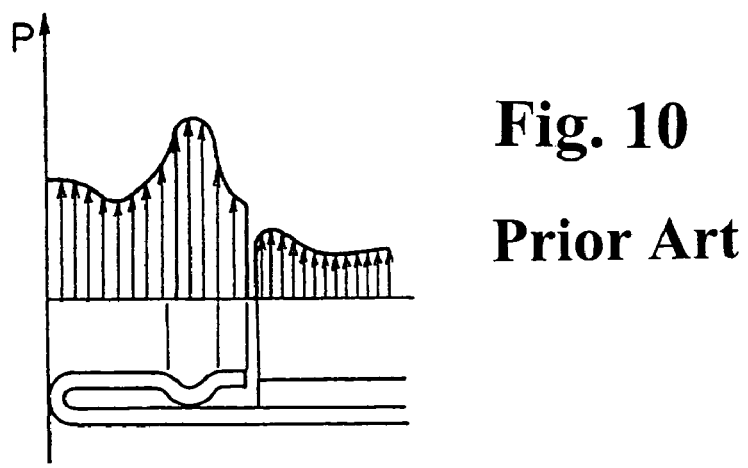
FIG. 10 is a chart showing an example of a surface pressure distribution of the cylinder head gasket shown in FIG. 9.

Cylinder head gaskets 1B–1D of other embodiments are shown in FIGS. 6–8.

In the cylinder head gasket 1B of the third embodiment as shown in FIG. 6, the half bead 32 of the second metal plate 30A in the second embodiment 1A is not formed, and in this portion, a second metal plate 30B and a third metal plate 40B are laminated on a first metal plate 10B. In this structure, a relatively calm surface pressure distribution is obtained outside the bead 11b.

In the cylinder head gasket 1C of the fourth embodiment as shown in FIG. 7, the full bead 31 in the second metal plate 30A is changed to a half bead 31c. In the structure formed of metal plates 10C, 30C, 40C, the surface pressure generated near the hole 2 for the cylinder bore is made smaller than that obtained in the cylinder head gasket 1A of the second embodiment.

The cylinder head gasket 1D of the fifth embodiment is formed by metal plates 10D, 20D, as shown in FIG. 8. Namely, in addition to the structure of the cylinder head gasket 1 of the first embodiment, a bead 12 projecting outwardly is formed at a side opposite to the bead 11b of the first metal plate 10D. In this portion, a very strong surface pressure is formed.

In the cylinder head gaskets 1 and 1A–1D as structured above, a seal portion having a flange 11 bent around the hole 2 for the cylinder bore is formed, and the annular portion 11a is provided in the flange 11 around the hole 2 for the cylinder bore, so that a large seal surface pressure is not generated immediately outside the hole 2 for the cylinder bore.

Also, since the bead 11b projecting outwardly is formed at the outer periphery of the flange 11 outside the annular portion 11a, a large seal surface pressure is generated at a portion slightly away from the hole 2 for the cylinder bore, i.e. the portion which does not affect large influence to the deformation of the hole 2 for the cylinder bore.

Also, since the outer skirt portion of the bead 11b is the outer peripheral edge 11c of the flange 11, there is no annular portion outside the bead 11b, so that the concentrated surface pressure is generated at the bead 11b. Thus, it is possible to generate an appropriate seal surface pressure.

Accordingly, a large seal surface pressure relative to the hole 2 for the cylinder bore is not generated close to the periphery around the hole 2 for the cylinder bore, and is formed around the portion slightly away from the hole 2 for the cylinder bore. Thus, the deformation of the cylinder bore is prevented while providing a sufficient sealing ability.

In the above embodiments, explanation was made for the cylinder head gaskets formed by two or three metal plates, but the invention is not limited to these structures. The invention is applied to the cylinder head gasket formed by four or more metal plates.

The disclosure of Japanese Patent Application No. 2004-028301 filed on Feb. 4, 2004 is incorporated herein.

While the invention has been explained with reference to the specific embodiments of the invention, the explanation is illustrative and the invention is limited only by the appended claims.

What is claimed is:

1. A cylinder head gasket for an internal combustion engine having a hole to be sealed, comprising:
   a first metal plate having a base portion, a first hole formed in the base portion corresponding to the hole to be sealed, a curved portion extending from the base portion to surround the first hole, a flange extending from the curved portion and located above the base portion, a flat annular portion formed in the flange and extending immediately from the curved portion, and a first bead formed in the flange outside the annular portion to project outwardly from the annular portion in a direction away from the base portion, said first bead having an inside skirt portion adjacent to the annular portion and an outside skirt portion extending from the inside skirt portion so that the flange terminates at an end of the outside skirt portion, and
   a second metal plate laminated on the base portion not to overlap with the flange.

2. A cylinder head gasket according to claim 1, wherein said outside and inside skirt portions are directly disposed on the base portion.

3. A cylinder head gasket according to claim 2, wherein said curved portion includes a space at a side opposite to the first hole to provide resiliency thereat.

4. A cylinder head gasket according to claim 3, wherein said second metal plate is arranged to form an annular space between the second metal plate and the flange.

5. A cylinder head gasket according to claim 1, wherein said base includes a second bead at a side opposite to the first bead to project in a direction opposite to that of the first bead.

6. A cylinder head gasket according to claim 1, further comprising a third metal plate located above the base portion and having a third bead located between the base portion and the annular portion.

7. A cylinder head gasket according to claim 6, wherein a part of the third metal plate is located above the second metal plate.

8. A cylinder head gasket according to claim 1, wherein said end of the outside skirt portion of the bead forms an outer peripheral edge of the flange.

9. A cylinder head gasket according to claim 8, wherein said flange consists of said flat annular portion, and said first bead adjacent to the flat annular portion.

* * * * *